US006870901B1

(12) United States Patent
Gudmundsson et al.

(10) Patent No.: US 6,870,901 B1
(45) Date of Patent: Mar. 22, 2005

(54) DESIGN AND ARCHITECTURE OF AN IMPAIRMENT DIAGNOSIS SYSTEM FOR USE IN COMMUNICATIONS SYSTEMS

(75) Inventors: Thorkell Gudmundsson, San Jose, CA (US); John Josef Hench, San Jose, CA (US); Amir Gholamhossein Zadeh Aghdam, Santa Clara, CA (US); Ioannis Kanellakopoulos, Cupertino, CA (US); Gurcan Aral, Cupertino, CA (US); Harbinder Singh, San Jose, CA (US); Yaolong Tan, Fremont, CA (US); Sunil C. Shah, Los Altos, CA (US)

(73) Assignee: Tokyo Electron Limited, Tokyo (JP)

( * ) Notice: Subject to any disclaimer, the term of this patent is extended or adjusted under 35 U.S.C. 154(b) by 198 days.

(21) Appl. No.: 09/711,684

(22) Filed: Nov. 10, 2000

Related U.S. Application Data

(60) Provisional application No. 60/220,079, filed on Jul. 21, 2000, provisional application No. 60/220,076, filed on Jul. 21, 2000, provisional application No. 60/183,675, filed on Feb. 18, 2000, provisional application No. 60/181,125, filed on Feb. 8, 2000, provisional application No. 60/165,399, filed on Nov. 11, 1999, and provisional application No. 60/164,986, filed on Nov. 11, 1999.

(51) Int. Cl.$^7$ .......................... H05M 1/24; H04L 12/42
(52) U.S. Cl. .................. 379/22; 379/1.01; 379/414; 370/242
(58) Field of Search ................. 370/203, 204, 370/241, 242, 252; 375/219, 222, 227, 377; 379/1.01, 22, 27.01, 22.01, 417, 414, 399.01, 377

(56) References Cited

U.S. PATENT DOCUMENTS

| | | | |
|---|---|---|---|
| 3,814,868 A | * 6/1974 | Bradley ................... 379/29.01 |
| 4,649,505 A | 3/1987 | Zinser, Jr. et al. ...... 379/406.08 |
| 4,669,113 A | 5/1987 | Ash et al. |
| 4,669,505 A | 6/1987 | Nelson et al. .............. 137/874 |
| 4,715,064 A | 12/1987 | Claessen ..................... 379/392 |
| 4,760,596 A | 7/1988 | Agrawal et al. ........ 370/406.08 |
| 4,987,569 A | 1/1991 | Ling et al. ................... 370/292 |
| 5,063,351 A | 11/1991 | Goldthorp et al. |
| 5,157,690 A | 10/1992 | Buttle ........................ 372/232 |
| 5,226,041 A | 7/1993 | Waclawsky et al. ........ 370/236 |
| 5,319,636 A | 6/1994 | Long et al. .................. 370/291 |
| 5,329,547 A | 7/1994 | Ling .......................... 370/342 |
| 5,343,461 A | 8/1994 | Barton et al. |

(List continued on next page.)

FOREIGN PATENT DOCUMENTS

| | | | |
|---|---|---|---|
| EP | 0917314 A2 | 5/1999 | ............ H04L/5/02 |
| EP | 0917314 A3 | 10/2001 | ............ H04L/5/02 |
| WO | WO098/52312 A3 | 11/1998 | ............ H04J/3/00 |
| WO | WO098/52312 A2 | 11/1998 | ............ H04J/3/00 |

OTHER PUBLICATIONS

Petersen, Brent R., et al., "Minimum Mean Square Equalization in Cyclostationary and Stationary Interference—Analysis and Subscriber Line Calculations", Student Member, IEEE Journal, vol. 9, No. 6, Aug. 1991, pp. 11.

(List continued on next page.)

Primary Examiner—Fan Tsang
Assistant Examiner—Ovidio Escalante
(74) Attorney, Agent, or Firm—Wood, Herron & Evans, L.L.P.

(57) ABSTRACT

A method and apparatus are disclosed. The method includes one or more of the following: compiling statistical models of physical layers of a communications system; creating a priori distributions of cross-talk transfer functions; storing the models and the a priori distribution in a storage medium; and using the models and the a priori distributions to diagnose probable causes of events detected in said communications system.

35 Claims, 7 Drawing Sheets

U.S. PATENT DOCUMENTS

| | | | |
|---|---|---|---|
| 5,406,552 A | 4/1995 | Long et al. | 370/291 |
| 5,521,971 A | 5/1996 | Key et al. | 379/221.07 |
| 5,548,222 A | 8/1996 | Jensen et al. | 324/628 |
| 5,848,151 A | 12/1998 | Boudy | |
| 5,862,157 A | 1/1999 | Bessios | 714/799 |
| 5,880,959 A | 3/1999 | Shah et al. | |
| 5,887,032 A | 3/1999 | Cioffi | |
| 5,926,538 A | 7/1999 | Deryugin et al. | |
| 5,929,896 A | 7/1999 | Goodman et al. | 348/14.12 |
| 5,995,566 A | 11/1999 | Rickard et al. | |
| 6,055,297 A | 4/2000 | Terry | |
| 6,091,713 A | 7/2000 | Lechleider et al. | 370/248 |
| 6,160,790 A | 12/2000 | Bremer | |
| 6,161,209 A * | 12/2000 | Moher | 375/262 |
| 6,172,970 B1 | 1/2001 | Ling et al. | 370/347 |
| 6,195,594 B1 | 2/2001 | Shah et al. | |
| 6,230,062 B1 | 5/2001 | Shah | |
| 6,249,762 B1 | 6/2001 | Kirsteins et al. | 704/233 |
| 6,317,495 B1 | 11/2001 | Gaikwad et al. | 379/417 |
| 6,377,636 B1 | 4/2002 | Paulraj et al. | 375/346 |
| 6,434,233 B1 | 8/2002 | Bjarnason et al. | 379/406.01 |
| 6,442,495 B1 * | 8/2002 | Fleming-Dahl | 375/227 |

OTHER PUBLICATIONS

Valenti, Craig F., Bellcore, "Cable Crosstalk Parameters and Models", ANSI Contribution TIE1.4/97–302 Technical Subcommitte Working Group Members, Spectral Compatibility, Morristown, NJ 07960, USA, Sep. 22, 1997, pp. 8.

Lennart Ljung, IEEE Transactions on Automatic Control, vol. AC–23, No. 5, Oct. 1978, "Convergence Analysis of Parametric Identification Methods", pp 770–783.

Sergio Verdu, Cambridge University Press, "Multiuser Detection", 1998, pp 1–26, 56–66, 154–175, 384–387.

Guanghan Xu et al., IEEE Transactions on Signal Processing, vol. 43, No. 12, Dec. 1995, "A Least Squares Approach to Blind Channel Identification", pp 2982–2993.

Alexandra Duel–Hallen et al., IEEE Transactions on Communications, vol. 37, No. 5, May 1989, "Delayed Decision–Feedback Sequence Estimation", pp 428–436.

K. Giridhar et al., IEEE Transactions on Communications, vol. 45, No. 4, Apr. 1997, "Nonlinear Techniques for the Joint Estimation of Cochannel Signals", pp 473–484.

Lang Tong et al., IEEE Transactions on Signal Processing, vol. 47, No. 9, Sep. 1999, "Joint Order Detection and Blind Channel Estimation by Least Squares Smoothing", pp 2345–2355.

Eric Moulines et al., IEEE Transactions on Signal Processing, vol. 43, No. 2, Feb. 1995, "Subspace Methods for the Blind Identification of Multichannel FIR Filters", pp 516–525.

Alexandra Duel–Hallen et al., IEEE Personal Communications, Apr. 1995, "Multiuser Detection for CDMA Systems", pp 46–58.

Upamanyu Madhow et al., IEEE Transactions on Communications, vol. 42, No. 12, Dec. 1994, "MMSE Interference Suppression for Direct–Sequence Spread–Spectrum CDMA" pp 3178–3188.

C. Richard Johnson, Jr. et al., Proceedings of the IEEE, vol. 86, No. 10, Oct. 1998, "Blind Equalization Using the Constant Modulus Criterion: A Review", pp 1927–1950.

P. Ciblat et al., "Asymptotic Analysis of Blind Cyclic Correlation Based Symbol Rate Estimation", Sep. 2000.

Dr. Dennis J. Rauschmayer, Macmillan Technology Series, "ADSL/VDSL Principles", 1999, pp 131–155.

Lennart Ljung, Prentice–Hall Information and System Sciences Series, "System Identification, Theory for the User", 1987, pp 141–163, 239–263.

Yaakov Bar–Shalom et al., Artech House, Inc., "Estimation and Tracking: Principles, Techniques, and Software", 1993, pp 450–465.

International Telecommunication Union, ITU–T Telecommunication Standardization Sector of ITU, G.810, "Definitions and Terminology for Synchronization Networks", Aug. 1996, pp 1–20.

ADSL Forum Technical Report TR–024 for Network Management Working Group, "DMT Line Code Specific MIB", Jun. 1999, pp 1–7.

J. Cioffi, EEE379A, Digital Communication: Signal Processing Class notes, Stanford University, pp 167–174, 194–197.

Arthur Gelb et al., The Analytic Sciences Corporation, "Applied Optimal Estimation", 1974, pp 156–179.

Simon Haykin, Prentice Hall Information and System Sciences Series, "Adaptive Filter Theory", Third Edition, 1996, pp 772–815.

Ian R. Petersen et al., Control Engineering, "Robust Kalman Filtering for Signal and Systems with Large Uncertainties", 1999, pp 35–55.

Stephen Boyd et al., "Convex Optimization", Course Reader for EE364: Introduction to Convex Optimization with Engineering Applications, Stanford University, Winter Quarter 1996–1997, pp 1–146.

Amit Mathur, Dissertation from Electrical and Computer Engineering, University of California, Santa Barbara, "Algorithms for Cochannel Source Separation and Signal Estimation", Dec. 1996, pp 1–165.

Edward A. Lee et al., Kluwer Academic Publishers, "Digital Communication", Second Edition, 1994, pp 408–424, 468–486.

Thomas Starr et al., Prentice Hall, Communication Engineering and Emerging Technologies, "Understanding Digital Subscriber Line Technology", 1999, pp 297–354.

D. Godard, IEEE Transaction Communications, vol. COM–28, No. 11, Nov. 1980, "Self–Recovering Equalization and Carrier Tracking in Two–Dimensional Data Communication Systems", pp 1867–1875.

Lennart Ljung, PTR Prentice Hall Information and System Sciences Series, "System Identification, Theory for the User", Second Edition, 1999, pp 79–139, 197–279, 317–360.

Raúl A. Casas et al., Broadcasting & Cable, "Current Approaches to Blind Decision Feedback Equalization", Aug. 1999, pp 1–52.

John G. Proakis, McGraw Hill Series in Electrical and Computer Engineering, Digital Communications, Third Edition, 1985, pp 267–286.

Craig Michael Teuscher, Dissertation submitted as requirement for the degree of Dr. of Philosophy in Engineering–Electrical Engineering and Computer Sciences, Low Power Receiver Design for Portable RF Applications: Design and Implementation of an Adaptive Multiuser Detector for an Indoor, Wideband CDMA Application, Fall 1998, pp 37, 43–52.

Claes Tidestav et al., Signals and Systems, Uppsala University, "Realizable MIMO Decision Feedback Equalizers", International Conference on Acoustics, Speech, and Signal Processing (ICASSP99) Mar. 1999, Phoenix, AZ, V.5, pp 2591–2594.

K. Sam Shanmugan et al., John Wiley & Sons, "Random Signals, Detection, Estimation and Data Analysis", 1988, pp 341–377.

Harry L. Van Trees, Massachusetts Institute of Technology, "Detection, Estimation and Modulation Theory", 1968, pp 19–163, 239–418.

PCT Search Report, PCT/US00/42097, Nov. 10, 2000, Date of Mailing: Jun. 26, 2001 (5 pgs.).

PCT Search Report, PCT/US00/30859, Nov. 10, 2000, Date of Mailing: Mar. 27, 2001 (5 pgs.).

PCT Search Report, PCT/US00/30858, Nov. 10, 2000, Date of Mailing: Mar. 16, 2001 (7 pgs.).

PCT Search Report, PCT/US00/30887, Nov. 11, 1999, Date of Mailing: Aug. 9, 2001 (24 pgs.).

PCT Search Report, PCT/US00/30967, Nov. 10, 2000, Date of Mailing: Jan. 24, 2001 (7 pgs.).

PCT Search Report, PCT/US00/31026, Nov. 10, 2000, Date of Mailing: Jan. 22, 2001 (7 pgs.).

Honig, M.L. et al, "Suppression of Near– and Far–End Crosstalk by Linear Pre– and Post–Filtering", Selected Areas in Communications, IEEE Journal on vol. 10 Issue 3, Apr. 1992, pp. 614–629, entire document.

* cited by examiner

|  | OFFENDER HDSL | OFFENDER SDSL | OFFENDER ADSL DMT | OFFENDER ADSL CAP |
|---|---|---|---|---|
| VICTIM HDSL | (33.4,6.29) (33.3,6.93) | (35.4,6.04) (35.3,6.69) | (36.3,5.75) (37.7,7.24) | (63.3,0.85) (38.9,7.46) |
| VICTIM SDSL | (28.7,6.07) (28.6,6.67) | (21.5,4.69) (21.4,5.51) | (17.9,4.69) (33.6,7.02) | (20.0,4.73) (34.7,7.17) |
| VICTIM ADSL DMT | (21.1,6.72) (7.86,6.09) | (24.7,6.58) (-3.43,5.55) | (51.8,0.00) (29.1,0.00) | (51.8,0.02) (27.2,1.83) |
| VICTIM ADSL CAP | (15.5,6.90) (9.74,2.24) | (19.1,6.84) (-19.5,5.53) | (46.3,0.00) (13.4,0.00) | (46.3,0.01) (13.4,0.00) |

FIG. 8

|  | OFFENDER HDSL | OFFENDER SDSL | OFFENDER ADSL DMT | OFFENDER ADSL CAP |
|---|---|---|---|---|
| VICTIM HDSL | (-86.1,6.29) (-86.0,6.93) | (-88.1,6.04) (-88.0,6.69) | (-89.0,5.75) (-90.4,7.24) | (-116,0.85) (-91.6,7.46) |
| VICTIM SDSL | (-85.5,6.07) (85.4,6.67) | (-78.3,4.69) (-78.2,5.51) | (-74.6,4.69) (-90.3,7.02) | (-76.8,4.73) (-91.5,7.17) |
| VICTIM ADSL DMT | (-88.2,6.72) (-89.0,6.00) | (-91.7,6.64) (-77.8,5.51) | (-119,0.00) (-110,0.00) | (-119,0.02) (-108,1.80) |
| VICTIM ADSL CAP | (-89.4,6.90) (-108,2.24) | (-93.0,6.84) (-78.8,5.53) | (-120,0.00) (-112,0.00) | (-120,0.01) (-112,0.00) |

FIG. 9

DESIGN AND ARCHITECTURE OF AN IMPAIRMENT DIAGNOSIS SYSTEM FOR USE IN COMMUNICATIONS SYSTEMS

This application claims the benefit of the filing date of the following Provisional U.S. patent applications:

"SPECTRAL MANAGEMENT AND OPTIMIZATION THROUGH ACCURATE IDENTIFICATION OF CROSS-TALK CHANNELS AND UNCERTAINTY", application No. 60/164,986, filed Nov. 11, 1999;

"SPECTRAL MANAGEMENT AND OPTIMIZATION THROUGH ACCURATE IDENTIFICATION OF CROSS-TALK CHANNELS AND UNCERTAINTY", application No. 60/181,125, filed on Feb. 8, 2000;

"SPECTRAL MANAGEMENT AND OP ATION THROUGH ACCURATE IDENTIFICATION OF CROSS-TALK CHANNELS AND UNCERTAINTY", application No. 60/183,675, filed on Feb. 18, 2000;

"USE OF UNCERTAINTY IN PHYSICAL LAYER SIGNAL PROCESSING IN COMMUNICATIONS", application No. 60/165,399, filed Nov. 11, 1999;

"PROBABILISTIC DIAGNOSIS OF CAUSE-EFFECT RELATIONSHIPS IN DYNAMIC NEIWORKS", application No. 60/220,079, filed on Jul. 21, 2000; and "METHOD AND SYSTEM ARCHITECTURE FOR DIAGNOSIS OF EVENTS IN DSL NETWORKS" application No. 60/220,076, filed on Jul. 21, 2000.

FIELD OF THE INVENTION

The present invention relates generally to the diagnosis and analysis of impairments in communications systems. More particularly, the present invention relates to using probabilistic modeling for diagnosing and analyzing the impairments, and to computational architecture for supporting the diagnosis and analysis of impairments.

BACKGROUND OF THE INVENTION

In the communications arena, one of the biggest challenges is to overcome crosstalk, noise, and other disturbances that interfere with signals. Whether the signals are transmitted over wires, cable, fiber optics, wireless, or other types of communication, the signals suffer from some level of interference.

Interference in the signal may lead to certain limitations of the communications system. For example, in wireless systems, such as cellular phones, interference may shorten the distance at which the signal can be reliably received and the clarity of the signal. As another example, in wire systems, such as digital subscriber lines (DSL), interference may shorten the distance at which the signal can be reliably received, i.e. limit loop reach. Interference may also decrease the bit rate of the data being transferred. Providers of telecommunications services recognize the need to monitor the quality of service provided to users of their network and to identify the causes of problems reported by their customers. This task, however, is complicated significantly by several factors.

Some of these factors include: the large number of network users, the large amount of data collected from the deployed lines, and the presence of competing providers in the same physical line plant. The coexistence of ILEC's (Incumbent Local Exchange Carriers) and CLEC's (Competitive Local Exchange Carriers) in the same cable binders, brought about by the federally mandated deregulation of local telecommunications markets, implies that the services deployed by one carrier may be disturbing the users of another carrier, who has no information about the source of this disturbance.

It is thus highly desirable to sort through the collected data and determine whether a specific line is being disturbed by external interference, such as AM radio stations, or by internal interference, such as another DSL service, and whether that offending service belongs to the same carrier or not. Unfortunately, with today's deployed monitoring technology, carriers are extremely limited in their ability to perform such diagnoses with adequate accuracy and reliability.

The following discussion outlines in detail many of the problems of digital subscriber line (DSL) technology and potential solutions thereto. However, the discussion merely uses DSL as one example of the many communications systems (e.g. wireline, wireless, optical, cable, etc.) in which the present invention may be used. Thus the present invention should not be limited to merely DSL communication systems.

As discussed in the next section and shown in the accompanying Figures, embodiments of the present invention provide such a solution by 1) a design using MIMO transfer functions and probabilistic cause-effect relationships, 2) in a multi-processor, event driven, computational architecture, and 3) algorithms that combine system identification of MIMO systems with propagation of multiple Bayesian hypothesis tests.

SUMMARY OF THE INVENTION

A method and apparatus are disclosed. The method includes one or more of the following: compiling statistical models of physical layers of a communications system; creating a priori distributions of cross-talk transfer functions; storing the models and the a priori distributions in a storage medium; and using the models and the a priori distributions to diagnose probable causes of events detected in the communications system.

BRIEF DESCRIPTION OF DRAWINGS

The invention is illustrated by way of example and not by way of limitation in the Figures of the accompanying drawings in which like references indicate similar elements. It should be noted that references to "an" embodiment in this disclosure are not necessarily to the same embodiment, and that "an" means at least one. The accompanying figures include:

FIG. 8 is a table showing statistical results (average and standard deviation) corresponding to the aggregate SNR of 15 Kft long victim lines for upstream and downstream.

FIG. 9 is a table showing statistical results (average and standard deviation) corresponding to the aggregate noise for upstream and downstream.

DETAILED DESCRIPTION OF THE INVENTION

Figure 1:
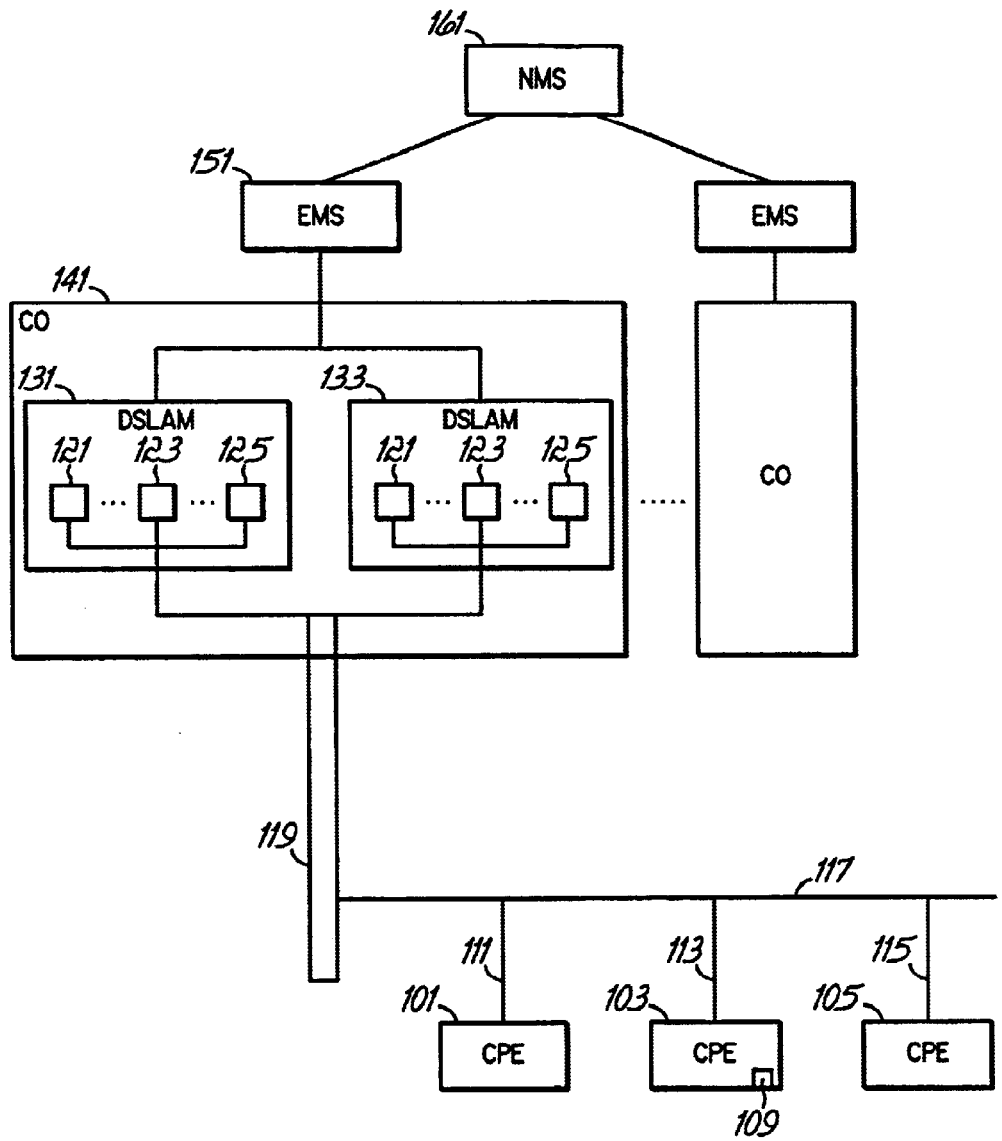
FIG. 1 shows a layout of a DSL system.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

Overview of General Communication Network

Figure 11:
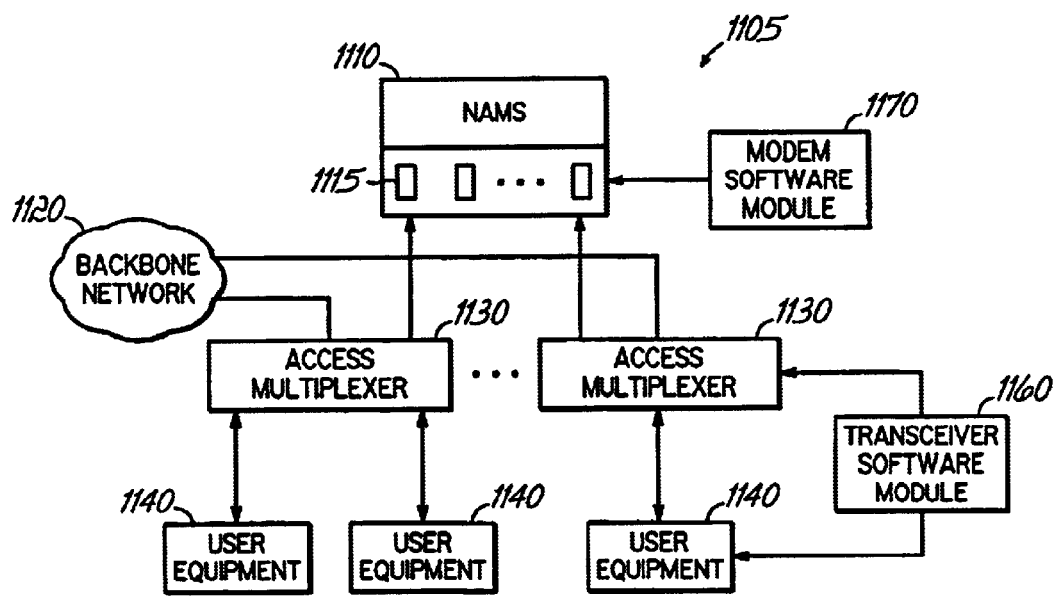
FIG. 11 illustrates an exemplary communication system that can benefit from the present invention.

The present invention is applicable to a variety of communication systems, for example: wireline, wireless, cable, and optical. FIG. 11 illustrates an exemplary communication system 1105 that may benefit from the present invention. The backbone network 1120 is generally accessed by a user through a multitude of access multiplexers 1130 such as: base stations, DSLAMs (DSL Access Mulitplexers), or switchboards. The access multiplexers 1130 communicate management data with a Network Access Management System (NAMS) 1110. The NAMS 1110 includes several management agents 1115 which are responsible for monitoring traffic patterns, transmission lines status, etc. Further, the access multiplexers 1130 communicate with the network users. The user equipment 1140 exchanges user information, such as user data and management data, with the access multiplexer 1130 in a downstream and upstream fashion. The upstream data transmission is initiated at the user equipment 1140 such that the user data is transmitted from the user equipment 1140 to the access multiplexer 1130. Conversely, the downstream data is transmitted from the access multiplexer 1130 to the user equipment 1140. User equipment 1140 may consist of various types of receivers that contain modems such as: cable modems, DSL modems, and wireless modems.

The invention described herein provides a method and system for managing the upstream and downstream data in a communication system. As such, the present invention provides management agents that may be implemented in the NAMS 1110, the access multiplexers 1130, and/or the user equipment 1140. One example of such a management agent is a system software module 1170 that may be embedded in the NAMS 1110. Another management agent that manages the data in the communication system 1105 is a transceiver software module 1160 that may be embedded in the access multiplexer 1130 and/or the user equipment 1140.

For illustration purposes and in order not to obscure the present invention, an example of a communication system that may implement the present invention is a DSL communication system. As such, the following discussion, including FIG. 12, is useful to provide a general overview of the present invention and how the invention interacts with the architecture of the DSL system.

Overview of DSL Example

The present invention may be implemented in software modules or hardware that DSL equipment manufacturers may then embed in their hardware. Thus, although FIG. 12 illustrates the present invention as software, the present invention should not be limited thereto. It should also be noted that this patent application may only describe a portion or portions of the entire inventive system and that other portions are described in co-pending patent applications filed on even date herewith.

Figure 12:
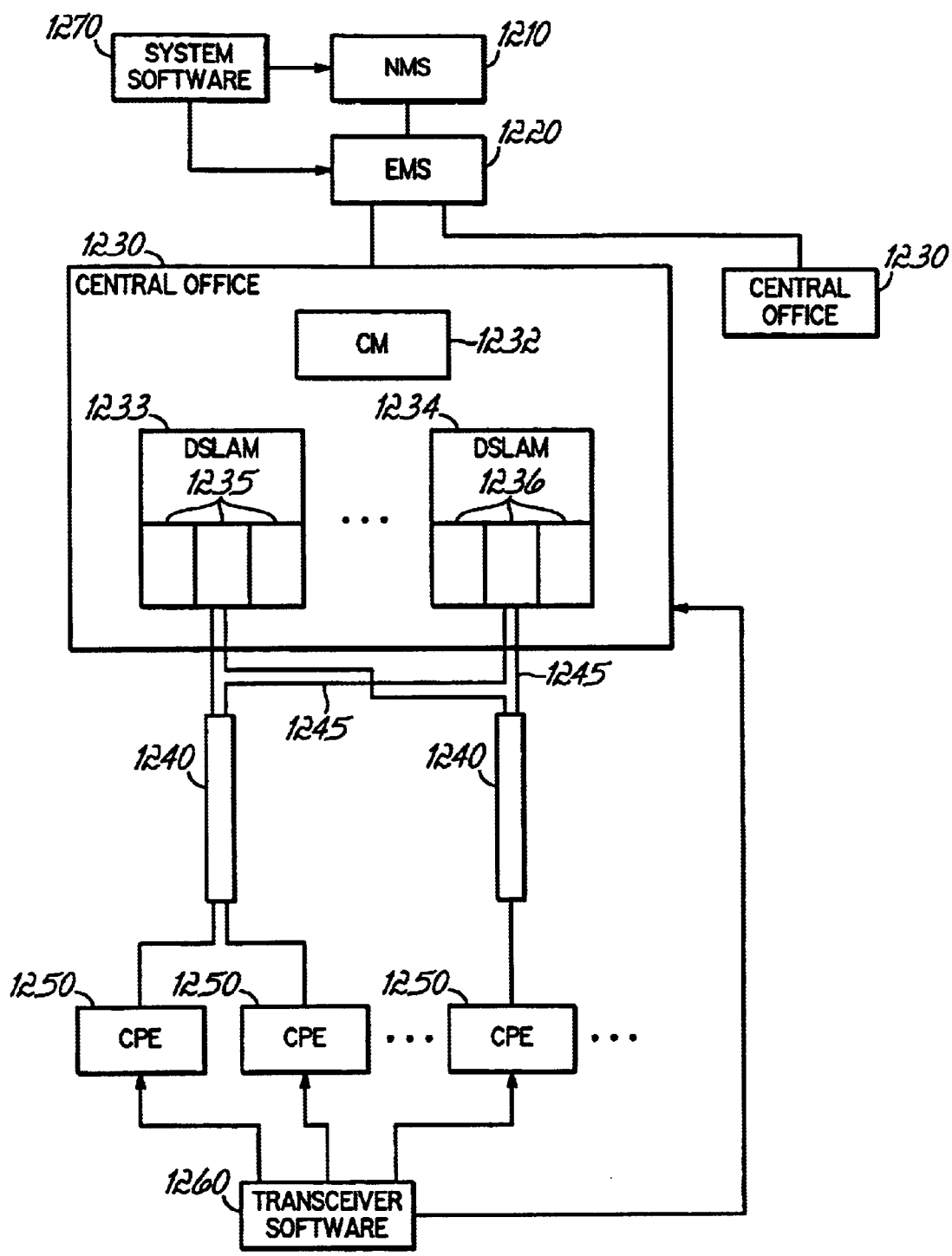
FIG. 12 illustrates how the present invention can be implemented as software.

FIG. 12 illustrates an exemplary embodiment of the present invention as implemented in a DSL system. The DSL system consists of a network of components starting from the Network Management System (NMS) 1210 all the way down to the Customer Premise Equipment (CPE) 1250. The following is a brief description of how these components are interconnected.

The Network Management System (NMS) 1210 is a very high level component that monitors and controls various aspects of the DSL system through an Element Management System (EMS) 1220. The NMS 1210 may be connected to several Central Offices (CO) 1230 through any number of EMSs 1220. The EMS 1220 effectively distributes the control information from the NMS 1210 to the DSL Access Multiplexers (DSLAMs) 1233 and forwards to the NMS 1210 network performance or network status indicia from the DSLAMs 1233. DSLAMs 1233 reside in a Central Office (CO) 1230, usually of a telecommunications company. Alternatively, DSLAMs 1233 may reside in remote enclosures called Digital Loop Carriers (DLC). The CO 1230 may have tens or hundreds of DSLAMs 1233 and control modules (CM) 1232. A DSLAM 1233 operates as a distributor of DSL service and includes line cards 1235 and 1236 that contain CO modems. The CO modems are connected to at least one line 1245, but more frequently it contains several line cards 1235 and 1236 that are connected to several lines 1245. Usually the lines 1245 are traditional phone lines that consist of twisted wire pairs and there may be multiple lines 1245 in a binder 1240 and multiple binders in a cable. The transmission cables act as packaging and protection for the lines 1245 until the lines 1245 reach the Customer Premise Equipment (CPE) 1250. It should be noted that a DSLAM 1235 does not necessarily have to be connected to lines 1245 in a single binder 1240 and may be connected to lines in multiple binders 1240. The lines 1245 terminate at the CPE 1250 in transceivers that include CPE modems. The CPE 1250 may be part of or connected to residential equipment, for example a personal computer, and/or business equipment, for example a computer system network.

As discussed in the background section, communications systems often suffer from interference and/or impairments such as crosstalk, AM radio, power ingress noise, thermal variations, and/or other "noise" disturbers. The present invention or portions of the present invention provide the user the capability to analyze, diagnose and/or compensate for these interferences and/or impairments. It also provides the ability to predict and optimize performance of the communication system in the face of impairments.

As illustrated in FIG. 12, the transceiver software 1260, depending upon how implemented, may provide the user with the ability to analyze, diagnose, and compensate for the interference and/or impairment patterns that may affect their line.

Also as illustrated in FIG. 12, the system software of the present invention 1270, depending upon how implemented, may provide the service provider with the ability to diagnose, analyze, and compensate for the interference and/or impairment patterns that may affect the service they are providing on a particular line. The diagnosis and analysis of the transceiver software also provide the ability to monitor other transmission lines that are not connected to the DSLAMs or NMS but share the same binders.

It should be noted that the system software of the present invention 1270 may be implemented in whole or in part on the NMS 1210 and/or EMS 1220 depending upon the preference of the particular service provider. Likewise, it should be noted that the transceiver software 1260 may be implemented in whole or in part on the DSLAM 1233 and/or transceivers of CPE 1250 depending upon the preference of the particular user. Thus, the particular implementation of the present invention may vary, and depending upon how implemented, may provide a variety of different benefits to the user and/or service provider.

It should also be noted that the system software of the present invention 1270 and the transceiver software 1260 may operate separately or may operate in conjunction with one another for improved benefits. As such, the transceiver software 1260 may provide diagnostic assistance to the system software of the present invention 1270. Additionally, the system software of the present invention 1270 may provide compensation assistance to the transceiver software 1260.

Thus, given the implementation of the present invention with respect to the DSL system example of FIG. 12, one of ordinary skill in the communications art would understand how the present invention may also be implemented in other communications systems, for example: wireline, wireless, cable, optical, and other communication systems. Further details of the present invention are provided below. Additional examples of how the present invention may be implemented in a DSL system are also provided below for illustrative purposes.

Although the present invention can be deployed in a number of communications systems, the invention will be described with reference to an illustrative deployment in a DSL environment. However, the present invention is not limited to deployment in DSL systems. Examples of other suitable environments in which the present invention can be deployed include: wireless, cable, DSL, optical, and similar communications systems.

As mentioned briefly above, the present invention includes methods and apparatuses for diagnosing and analyzing impairments in a communications system. Impairments to be diagnosed may be potential unforeseen disruptions in or loss of service. Additionally, impairments to be diagnosed may be associated with potential foreseen deployment of new service types or deployment of additional lines. One embodiment of the present invention can be used to optimize deployment of service types within a communications system.

Definitions:

To assist the reader, the following definitions relating to DSL networks and to embodiments of the present invention are provided.

Asymmetric DSL—services that reserve approximately unequal amounts of bandwidth for a customer's upstream and downstream data traffic.

Binder—a grouping of approximately ten thousand twisted wire pairs.

Channel—a communication path

CO—Central Office. In a DSL environment, the central office is a hub for the lines and typically contains one or more DSLAMs.

CPE—Customer Premise Equipment. In a DSL environment, CPE's are modems and central processing units (CPUs) located at individual residential or corporate locations.

DSLAM—Digital Subscriber Line Access Multiplexer.

DSL—Digital Subscriber Line.

In-domain—lines or channels monitored by a network management system (NMS).

Line—a type of channel characterized by a cable on which the information carrying signal travels. In a DSL environment, the lines are typically the twisted pairs commonly found in the plain old telephone system (POTS).

Line Card—a type of transceiver used in DSL applications and connected with one or more lines to monitor, collect, and pass on data from the lines to a higher level of processing. Usually, one or more line cards are provided in a DSLAM.

Offender or Disturber—a source of interference. In the DSL environment, examples of possible offenders include: a line, a transceiver which transmits on a line, an amplitude modulation (AM) radio station, a variation in temperature, and similar things.

Out-of-Domain—lines or channels not monitored by a network management system (NMS).

Symmetric DSL—services that reserve equal amounts of bandwidth for a customer's upstream and downstream data traffic.

Victim—a location which experiences interference with normal signal propagation.

Because the layout and structure of a DSL network is key to understanding the present invention and why various embodiments of the present invention are structured as they are, the accompanying Figures have been provided and are now described.

FIG. 1 illustrates the layout of a typical DSL network. Network 100 includes four processing layers, A, B, C and D. Level A is the lowest level, B the next highest, C the next highest, and D the topmost level. In this Figure, customer premise equipment (CPE) 101, 103, 105, located on level A, are communicatively coupled to a central office (CO) switching center 141 via twisted pair telephone lines 111, 113, 115. As mentioned above, CPEs 101, 103, 105 are associated with individual residential or corporate locations, although one individual location may have one or more CPEs associated therewith. Approximately two thousand twisted pair lines 111, 113, 115 are coupled to a distribution cable 117, which is coupled to a feeder cable 119. Typically, feeder cable 119 houses about ten thousand twisted wire pairs in about four hundred binders. Note that the ordinary telephone lines coupling DSLAM 131, 133 with CPE 101, 103, 105 are tightly packed together within the binder without shielding. Impairments occur because individual lines within each binder are not protected from receiving electromagnetic interference associated with the signals appearing on other lines, and because the signal on a line freely radiates within the binder so as to interfere with signals on other lines. The interference just described is commonly referred to as cross-talk, and typically increases as the frequencies of a signal on a phone line increase.

In the exemplary network shown in FIG. 1, at least one transceiver (e.g. transceiver 109 in CPE 103) is operatively associated with each of CPEs 101, 103, and 105. In one layout, transceiver 109 controls the reception of information from the service provider ("downstream" information) and controls the transmission of information from the CPE to the service provider ("upstream" information). For example, in network 100, information that flows from CO 141 or higher towards CPEs 101, 103, 105 has a "downstream" direction, while information that flows from CPE 101, 103, 105 toward CO 141 has an "upstream direction."

Data from lines 111, 113, 115 flows upwards from level A to level B, where line cards 121, 123, 125 reside. In some embodiments, a plurality of line cards are associated with DSLAM 131 and operate to monitor data collected from lines 111, 113, 115. Whenever a line card detects an impairment such as a change in SNR or a change in a line's operating mode (e.g. a line unexpectedly switches from showtime to idle, or vice versa), the line card forwards the impairment to the next highest level for processing. One problem associated with forwarding detected impairments from the line cards 121, 123, 125 to the next highest level is that impairments which occurred simultaneously in different lines may not be reported synchronously. Accordingly, an aspect of the present invention provides a method of correlating detected impairments in time.

The next highest processing level in the layout depicted in FIG. 1 is level C. At this level, CO 141 includes a plurality of DSLAMs 131, 133, which operate to forward and to collect upstream/downstream information sent from/to CPE 101, 103, 105 and Network Management System (NMS) 161. Located at level A, the highest level of processing, NMS 161 controls a service provider's network 100. As can be readily seen from FIG. 1, NMS 161 handles a vast amount of data. Considering each binder contains twenty-five to one hundred lines, that each CO 141/EMS 151 handle about ten thousand lines, and that NMS 161 handles multiple COs 161, the lines which NMS 161 is responsible for monitoring, diagnosing, and analyzing can easily scale into the millions.

At first glance, diagnosing anything from the NMS level would seem impractical. However, such diagnosis can be accomplished when one remembers that only the lines contained within each binder are coupled, meaning that crosstalk interference from one line inside a binder affects only the other lines contained within that same binder. But often, knowledge of which line belongs to which binder is not available or is not accurate. Therefore, finding causes of impairments potentially requires looking at all data from a CO 141. This can require very high computation and data traffic. As discussed further below, in *Statistical Modeling, Service Specific Parameters*, and *Overview of System Architecture of the Present Invention*, aspects of the present invention provide computational models, techniques, and multi-level architecture that permit a practically implementable solution.

Additionally, it should be noted that various types of diagnosis and analysis reports may be generated, depending upon the application. For instance, in the DSL application, the report may include the type of activity of all diagnosed out-of-domain and in-domain offenders and victims that are estimated to be in a given binder. Since twisted pair lines in a binder often terminate in a small geographical area of users, e.g. within several hundred feet, such a report may also provide information regarding services deployed by other carriers in that small geographical area.

Statistical Modeling

In a monitored DSL or other communications system, the offenders (sources) causing one or more detected impairments are not known. For example, a sudden drop in a line's SNR could result from one of three main offenders, such as an AM station, another line in the binder, or a thermal source. However, all that is known at the time, is that a particular impairment has occurred.

Figure 10:
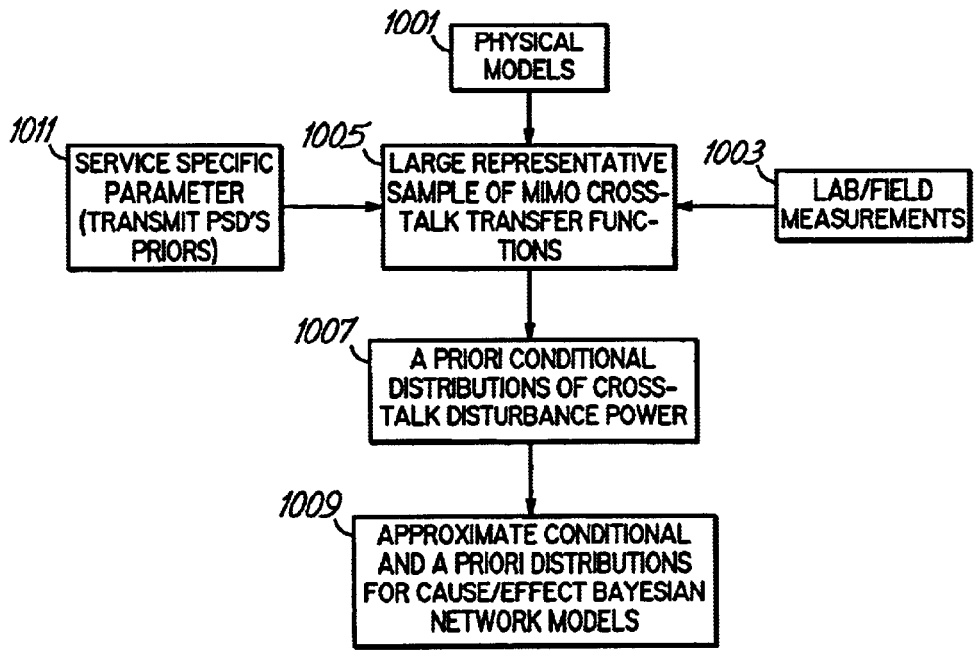
FIG. 10 illustrates how a priori conditional distributions of cross-talk disturbance power are created, according to one embodiment of the invention.

FIG. 10 illustrates how a priori conditional distributions of crosstalk disturbance power are created according to an aspect of the present invention. Block 1005 represents the compilation of a large representative sample of MIMO crosstalk transfer functions. These transfer functions are compiled from physical models included in block 1001 and/or from lab/field measurements represented by block 1003, and are stored in a database, table, or other suitable storage medium. The a priori conditional distributions of cross-talk disturbance power represented by block 1007 are created by multiplying the known power spectral densities of various service-types 1011 with the MIMO crosstalk transfer functions of block 1005. Once calculated, the a priori conditional power distributions of block 1007 are stored in a database, table or other suitable storage medium, and later used in block 1009 to generate approximate conditional and prior distributions for use in cause-effect Bayesian Network models. These a priori conditional distributions of crosstalk disturbance power allow the diagnosis system to make assessments useful to a DSL service provider based on incomplete or uncertain data. Once the statistical information is obtained, one can compare it with the magnitude of the crosstalk noise power on the victim line, to obtain the probability of the corresponding noise being introduced by different service types interacting with the victim.

Figure 2:
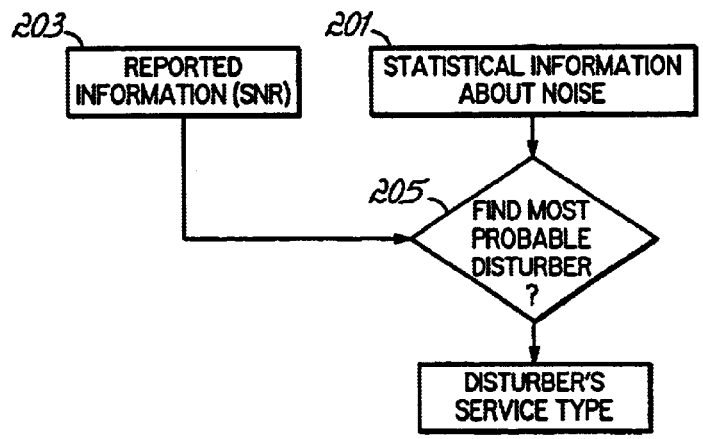
FIG. 2 illustrates how statistical information is used to find the most probable disturber.

FIG. 2 provides a high-level diagram of the diagnostic process. In one embodiment of the present invention, the process begins by accumulating statistical information about noise (block 201). This information can be based upon the physics of interference, interference theory, and/or actual measurements from field testing or laboratory experiments. When an impairment is detected and reported (block 203), the reported data is compared with the prior statistical models and analyzed to determine the most probable disturber (block 205). The result of the diagnosis is an identification of the disturber's probable service type (e.g. DSL, ADSL, HDSL, AM, thermal, etc.)

In some embodiments of the present invention, the magnitude of a victim's SNR, main channel transfer function, and power spectral density (PSD) of the victim's service type can be used in the following formula to determine the magnitude of the crosstalk noise on the victim's line.

$$SNR = \frac{|H_{mc}|^2 \cdot PSD_v}{\text{External Noise Power} + |H_{NEXT}|^2 \cdot PSD_o}$$

Once known, the crosstalk noise on the victim's line can be compared with statistical models to determine the offender's probable service-type. In the above equation, external noise represents the noise introduced by external sources such as AM interference and temperature, $H_{mc}$ represents the main channel transfer function, $H_{NEXT}$ represents the NEXT transfer function, and $PSD_v$ and $PSD_o$ denote the power spectral density of the victim's service-type and the offender's service type, respectively. The summation in the denominator indicates that there may be more than one DSL disturber. Because the power of external noise is approximately known in most cases, one can compute the power of crosscoupling noise once a significant and persistent change in SNR occurs. It should be noted that, alternatively, the statistics of the SNR corresponding to different victim service types and to different offender service types can be extracted and compared to the current SNR for diagnosis. However, the corresponding statistics would be a function of distance because the main channel transfer function is a function of distance between a CO and a CPE.

In practice, instead of the SNR at different frequencies, the average value of SNR over all frequencies (aggregate SNR) or some other functions of SNR are reported. This fact should be taken into account when finding the statistical values.

Figure 3:
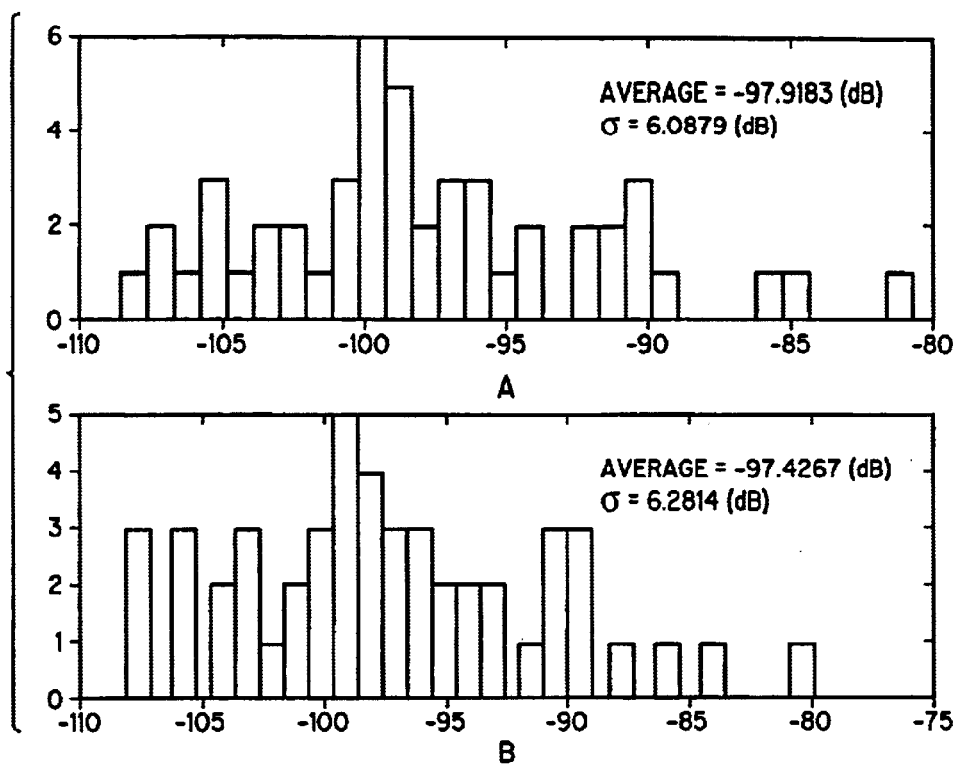
FIG. 3 illustrates the distribution of aggregate noise for an HDSL victim and HDSL offender in showtime, based on 49 NEXT transfer functions.
Figure 4:
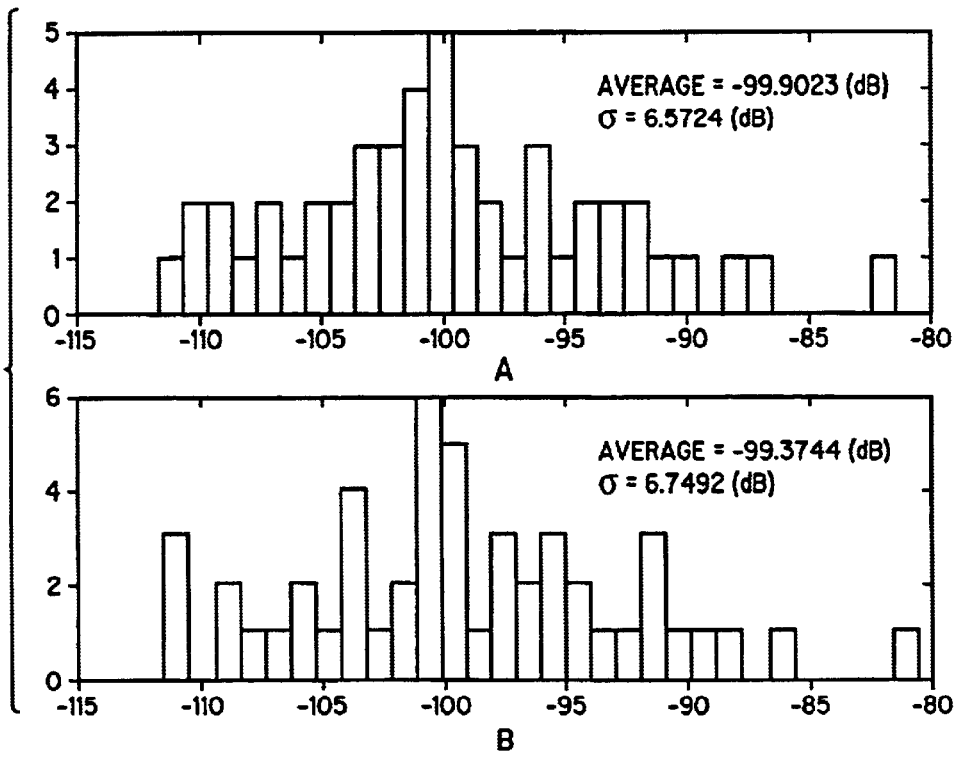
FIG. 4 illustrates the distribution of aggregate noise for an HDSL victim and SDSL offender in showtime, based on 49 NEXT transfer functions.

The histograms shown in FIGS. 3 and 4 provide examples of aggregate crosstalk disturbance (in db) caused by different offender and victim service-types. The example shown in FIG. 3 illustrates the distribution of aggregate noise for an HDSL victim and HDSL offender in showtime, based on 49 NEXT transfer functions. The example shown in FIG. 4 illustrates the distribution of aggregate noise for an HDSL victim and SDSL offender in showtime, based on 49 NEXT transfer functions. FIGS. 3a and 4a depict upstream data, while FIGS. 3b and 4b depict downstream data.

Two different service types are examined here: HDSL (transmit frequency 196 KHz) and SDSL (transmit frequency 580 KHz). Assuming that the magnitude of upstream crosstalk disturbance on the victim is about −100 db, these figures show that six our of forty-nine results obtained for a HDSL victim offended by a HDSL offender correspond to −100 db noise (and its neighborhood), while five out of forty-nine results correspond to a SDSL offender (both in upstream). Based on the equation above, the probability of a HDSL line being offended by another HDSL line is 6/(5+6), while the probability of it being offended by a SDSL line is 5/(5+6). It should be noted that the diagnosis process can be simplified by approximating the distributions with a normal distribution.

Overview of Statistical Models and Bayesian Estimation Techniques

One embodiment of the invention diagnoses probable offenders for a given impairment using Bayesian estimation techniques. In a nutshell, Bayesian estimation uses a priori statistical models and likelihood functions of measured data to produce a posterior probability distributions from which hypothesis tests and parameter estimates may be made.

The kinds of Bayesian estimation techniques used in various embodiments of the present invention fall roughly into two areas: static and dynamic. The static problem uses the maximum a posteriori estimates in hypothesis testing and is nicely formulated in the framework of Bayesian belief networks. For an example of the static problem, see co-pending application entitled "Method and Apparatus for Impairment Diagnosis in Communication Systems" by nventors: John Josef Hench, Thorkell Gudmundsson, Amir Gholamhossein Zadeh Aghdam, Ioannis Kanellakopoulos, Gurcan Aral, Yaolong Tan, Harbinder Singh, and Sunil C. Shah, assigned to the assignee herein, and filed on even date herewith. On the other hand, the dynamic problem is formulated within the framework of Generalized Pseudo-Bayesian (GPB) estimation. The GPB technique implemented by various embodiments of the present invention is related to the Interacting Multiple Model Algorithm (IMM). For an example of the GPB technique and IMM, see co-pending application entitled "Method and Apparatus for Impairment Diagnosis in Communication Systems" by inventors: John Josef Hench, Thorkell Gudmundsson, Amir Gholamhossein Zadeh Aghdam, Ioannis Kanellakopoulos, Gurcan Aral, Yaolong Tan, Harbinder Singh, and Sunil C. Shah, assigned to the assignee herein, and filed on even date herewith.

Since the use of Bayesian estimation techniques requires the use of good statistical models (priors), various embodiments of the present invention periodically (or continuously) refine the a priori models used in diagnosis and analysis. Realistic statistical models of the crosstalk coupling for various service-types should be produced for analyzing static problems. Examples of such models are provided in the discussion of FIGS. 2–4, above. For the dynamic problem, realistic jump linear models describing steady state/non steady state transitions should be developed. An example of such a jump linear model is provided in the next section, *Event Statistics*. A technique to automatically refine and upgrade statistical models is discussed in the section, *Statistics Server*.

Bayeslan Estimation Techniques

Both statistical parameter estimation and hypothesis testing are integral to various embodiments of the present invention. Several common elements of these statistical estimation techniques are:
1. joint probability density functions (pdfs) or probability mass functions (pmfs);
2. a priori pdfs or pmfs; and
3. conditional pdfs or pmfs.

These statistical models (written as either pdfs or pmfs) are commonly used in Bayesian estimation schemes from which a variety of hypothesis tests may be made or recursive parameter estimates algorithms may be run. For example, suppose the random variable y were observed to take on the value Y. In Bayesian form, the probability that the random variable x will take on the value X when y is observed may be written as conditional probability density function p(x|y) The conditional probability function may be further written as:

$$p(x|y) = p(y|x)p(x)/p(y) \text{ or } p(x|y) = p(x, y)/p(y)$$

In both of these equations, the probability density functions on the left hand side of the equal signs are called a posteriori probability density functions, while the pdfs on the right hand side of the equal signs are called a priori pdfs. A priori pdfs are pdfs which are known. The a priori pdfs, together with additional information gleaned from the physics of interference, data about impairments caused by different offender service-types provided by a DSL provider or from experiment, form a body of vital statistical information known as priors. Simply put, priors are the various offenders known to cause particular impairments, which may or may not be detected in a monitored DSL or other communications system. In other words, each offender creates a unique and/or characteristic "fingerprint" impairment(s), which can be modeled (and stored on a statistics server) and then compared to a detected impairment. For example, interference from an AM station results in a significant, spiked drop in a victim's SNR. Thus, if a significant, narrow drop in the SNR of a victim is observed, a high probability exists that the drop was caused by an offending AM station. If similar drops in SNR are discovered in multiple lines at about the same time, the probability of the offender being an AM station increases dramatically, since it is known (from priors) that an AM offender can affect multiple lines simultaneously. Naturally, the accuracy of any parameter estimation or hypothesis test depends on the accuracy of the a posteriori statistical models, which depend on the accuracy of the a priori statistical models. One advantage of the present invention is that it can improve the accuracy of a priori statistical models (written as pdfs or pmfs) by using data (a posteriori models) harvested from monitored lines to update the a priori statistical models. In other words, theoretical statistical models (priors) can be used initially to diagnose detected impairments. These impairments (and their offenders), in turn, can be used in various embodiments of the invention to create practical statistical models (priors) that can be used to diagnose impairments detected at some point in the future. This process of updating priors is accomplished using a statistics server, the operation of which is described below in *Statistics Server*.

Event Statistics

In a DSL universe, and in one embodiment of the present invention, a line card processor, which detects an impairment, is tasked with determining whether a change in the reported SNR of a monitored line is significant enough to warrant forwarding the impairment to higher computational layers for analysis. To detect transitions between non-steady state and steady state, various embodiments of the present invention use a jump-linear system modeled by the equations $$x(k)=F[M(k)]x(k-1)+v[M(k)](k-1) \quad (1)$$

$$z(k)=H[M(k)]x(k)+w[M(k)](k), \quad (2)$$

where M(k) denotes the mode at time k, i.e., the model in effect at the end of the sampling period k. The process and measurement noises, v(k) and w(k) are modeled as zero mean normally distributed white noise processes with variances $$E[v[M_j]v^T[M_j]]=Q_j \quad (3)$$

$$E[w[M_j]w^T[M_j]]=R_j \quad (4)$$

The transitions between modes is modeled as a Markov process with transition probabilities $$p_4=P\{M(k)=M_j|M(k-1)=M_j\} \quad (5).$$

The jump-linear system allows M(k) to be one of several possible modes, but for the purpose of noise change detection, we shall consider only two modal states, $M_1$ and $M_2$, where $M_1$ corresponds to steady state and where $M_2$ corresponds to non-steady state. The vector x(k) will be referred to as the base state, which either represents the quantity of noise on a line, or a norm of the main channel transfer function, with the values of F and H being unity.

Thus, the statistical model used for the purpose of impairment detection is:

$$x(k)=x(k-1)+v_j(k-1) \quad (6)$$

$$z(k)=x(k)+w_j(k), \quad (7)$$

$$E[v_j^2]=Q_j \quad (8)$$

$$E[w_j^2]=R_j \quad (9)$$

$$p_4=\pi\epsilon\Re^{\infty 2} \quad (10)$$

The model above is applied for each service type (e.g. DSL, AM, HDSL, ADSL, etc.), and in the case of services that provide bin-based information, for each bin. A single value of the Markov matrix, is common to all service types. To simplify the modeling for bin-based information, the value of $Q_j$ for each of the bins is derived by scaling a base value by a function proportional to $f^{3/4}$, where f is the central frequency of the bin.

Disturber/Co-Channel Statistics

In diagnosing detected impairments in a communications system, it is helpful to know whether the impairment is being caused by an internal (in domain) offender or by an external (out of domain) offender. In one embodiment of the present invention, aggregate values of SNR (discussed below), transmitted power values, and attenuation values can be used to diagnose which disturber source (offender) caused an internal disturbance (such as crosstalk between different DSL lines). In another embodiment, diagnosis of external offenders (such as AM interference and thermal effect) can be accomplished by looking at 1) the number of the disturbed lines and 2) the rate of SNR change.

Aggregate SNR

Each victim line has a SNR unique to that line. This SNR depends on both victim's and offender's service-types, as well as the victim's line length (which affects the magnitude of the SNR through the main channel transfer function). Information about crosstalk transfer functions and main channel transfer functions, along with the power spectral density of different service-types, can be used to collect statistical data about the aggregate SNR of the system. Using this statistical data, statistical models can be constructed which correspond to each offender and each victim (of different lengths). Preferably, the statistical results are a set of totally distinct probability density functions (PDF) corresponding to the SNR of the different combinations of the victim and offender service-types, and which can be used to identify the source of crosstalk.

Specifically, the source of crosstalk can be identified by looking at the magnitude of the aggregate SNR and specifying the matching PDF. In reality, however, the corresponding PDFs have some overlap which will cause uncertainty in the diagnosis process. Assuming that the characteristics of the PDFs can be mainly described by average and standard deviation, a table can be created (for each line length) whose rows denote the victim's service-types, and whose columns denote the offender's service-type. Each element of the table includes two pairs of numbers, representing the average and standard deviation of the resulted aggregate SNR of each victim (upstream and downstream), caused by each offender. Naturally, the accuracy of crosstalk diagnosis depends on how distinct the average values are, and on how small the standard deviations are. The table shown in FIG. 8 indicates the corresponding results for 15 kilo feet long victim lines.

In FIG. 8, there are two pairs of numbers assigned to each victim and offender. The first pair (on top) corresponds to upstream aggregate SNR, and the second pair (at the bottom) corresponds to downstream aggregate SNR (all in dB). Additionally, each pair of numbers includes two elements. The first element denotes the average value of the aggregate SNR observed on the victim line, resulted by the corresponding offender, while the second element denotes the standard deviation associated with it. In the example shown above in FIG. 8, the results are obtained by using a 15 kilo feet victim line with two bridge taps, operating at 20 degree Celsius, and a set of 49 measured cross-coupling transfer functions.

In order to use the statistical results of aggregate SNR in disturbance diagnosis, one must have a set of look-up tables corresponding to different line lengths, and use the table associated with the victim's line length. This implies that the information about the line length is required to exist. Such information may be provided by TELCO, or can be derived from the reported aggregate attenuation. However, since the reported attenuation is the difference between the received power and transmitted power (in dB), and the received power is also affected by the cross-coupling, the reported attenuation is a random variable whose average and standard deviation can be derived in a way similar to the aggregate SNR. However, the information obtained from the aggregate attenuation and aggregate SNR will have a high degree of uncertainty.

The relationship between aggregate ATN and other system parameters and variables is given by:

$$\text{Aggregate ATN} = f(H_{mc}, H_{xc}, PSD_v, PSD_o)$$

where $H_{mc}$ denotes the main channel transfer function of victim, $H_{xc}$ denotes the crosscoupling transfer function between victim and offender, and $PSD_v$ and $PSD_o$ denote the power spectral density of the signal transmitted by victim and offender, respectively.

Aggregate Noise

In another embodiment of the present invention, the statistical information of total aggregate noise can be used for disturbance diagnosis as an alternative to using statistical information corresponding to the aggregate SNR. The following equations describe aggregate SNR and aggregate attenuation (ATN) in the linear scale:

$$\text{Aggregate } SNR = \frac{\text{Received Aggregate Power}}{\text{Total Aggregate Noise}}$$

$$\text{Aggregate } ATN = \frac{\text{Transmitted Aggregate Power}}{\text{Received Aggregate Power} + \text{Total Aggregate Noise}}$$

These equations lead to the following formula for total aggregate noise:

$$\text{Total Aggregate Noise} = \frac{\text{Transmitted Aggregate Power}}{(\text{Aggregate } SNR + 1) \times \text{Aggregate } ATN}$$

These formulas indicate that the total aggregate noise can be calculated using the reported values of the aggregate SNR and ATN. Once the total aggregate noise has been calculated, the most probable source of cross-talk can be determined by comparing the resulted value with the corresponding statistical information. The main advantage of using the aggregate noise method is that knowledge of the line length is not required.

FIG. 9 shows the statistical results for aggregate noise by using a set of 49 measured crosscoupling transfer functions. Note that the accuracy of the results can be increased by: 1) monitoring more victim lines; and/or 2) combining these statistical results with a priori information regarding the number of in-domain service-types (and possible information about the number of different out-of-domain service types) in a Bayesian Belief Network (BBN).

Figure 5:
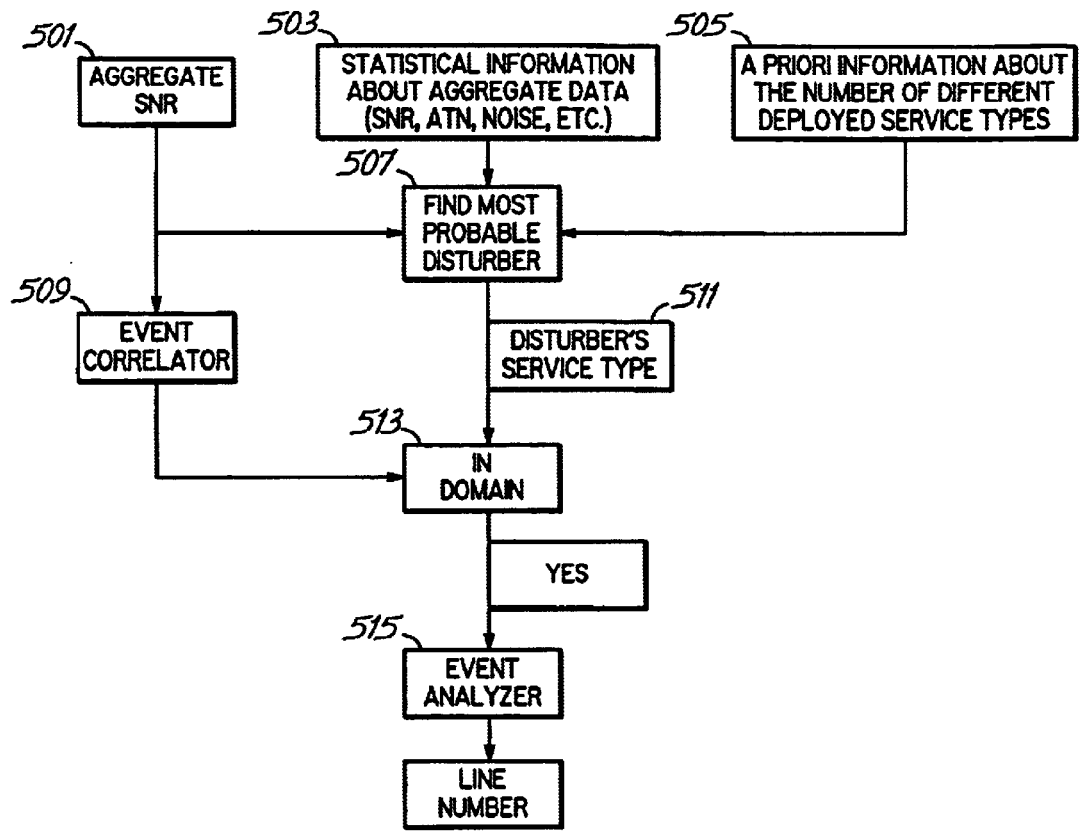
FIG. 5 illustrates how aggregate SNR, statistical models, and a priori information can be used to determine the line number of the most probable disturber.

FIG. 5 provides an illustration of the diagnosis process just described. First, the information represented by blocks 501, 503, 505 is constructed and stored in a database. Block 501 represents the aggregate SNR or aggregate Noise. Block 503 represents statistical results for Aggregate SNR or Aggregate Noise for each victim and offender constructed using the methods outlined above or similar methods. Block 505 represents a priori information about the number of different deployed service-types. Blocks 501, 503, 505 are combined to determine the most probable offender service-type (blocks 507, 511) that matches the reported data. Block 509 uses the time stamp of the reported events to determine if the corresponding event is in-domain or out-of domain (block 513). If the offender is in-domain, this information can be analyzed in block 515 to determine the exact line number of the offender.

Depending upon the embodiment, either the normal distribution approximation, or the exact distribution of the statistical data obtained in this section can be used.

Gaussian Approximation Approach

In one embodiment of the present invention adapted for use in DSL systems, the average and standard deviation corresponding to the disturbance caused by different offender service-types on different victim service-types, can be used to construct a normal approximation for the distribution of the corresponding disturbance. Once a change in the disturbance on a victim line is reported, the PDF of different offender service-types at the magnitude of the reported disturbance can be compared to find the probability of each service-type being the offender. (assuming the change in disturbance is caused by only one offender line and that no simultaneous events occur). For example, assume that there are four candidate offender service-types disturbing a HDSL line, and that the reported upstream disturbance magnitude is −100 dB. Using the normal approximations, the values corresponding to the four candidate offenders in the corresponding PDFs are given by:

HDSL offender: 0.0618

SDSL offender: 0.0607

ADSL DMT offender: 0.0521

ADSL CAP offender: 0.0000

Using these values, the probability of each service type being the offender can be estimated as follows:

HDSL service being the offender: 0.0618/(0.0618+0.0607+0.0521)=35.40%

SDSL service being the offender: 0.06071/(0.0618+0.0607+0.0521)=34.77%

ADSL DMT service being the offender: 0.0521/(0.0618+0.0607+0.0521)=29.84%

ADSL CAP service being the offender: 0.00%

To calculate the probability corresponding to each candidate offender, the average and standard deviation corresponding to each disturber can be given to a Bayesian Belief Network (BBN).

Statistics Server

Figure 6:
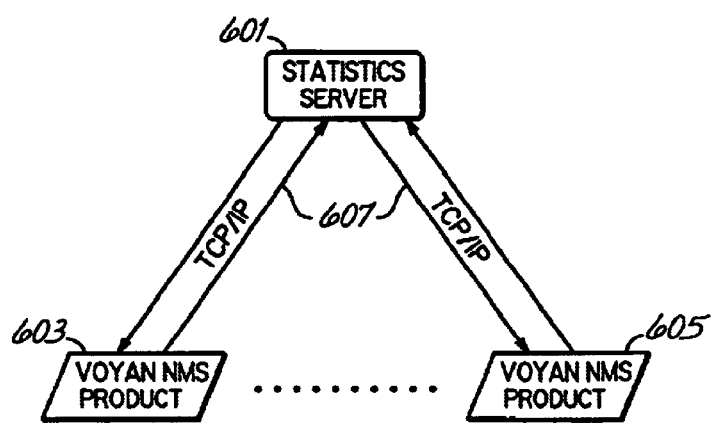
FIG. 6 illustrates the operation of a statistics server, according to one embodiment of the present invention.

As mentioned previously, in some embodiments of the present invention, the accuracy of a priori statistical models (written as pdfs or pmfs) may be improved by taking advantage of the a posteriori statistical models developed by various software modules associated with the present invention which are deployed at various levels in a DSL or other communications system. These local statistical models can periodically be sent via a TCP/IP connection to a centrally located computer, called the statistics server 601, shown in FIG. 6. This figure illustrates (at a high level) how an embodiment of the present invention continuously (or periodically) updates its a priori statistical models with local a posteriori models developed from impairments detected in a monitored DSL or other communications system. Blocks 603, 605 represent software modules deployed at various the CO level or below, which transmit information to and receive data from statistics server 601 using a TCP/IP connection 607.

Statistics server 601 refines the global statistical models stored in its database, based on information received from blocks 603, 605. In turn, blocks 603, 605 can receive the updated statistical models from statistical server 601 and use the refined a priori statistical models to improve the performance of their parameter estimation or hypothesis testing algorithms.

Service Specific Parameters

SUMMARY

This section summarizes the service specific parameters that are used in the various embodiments of the present invention. These parameters capture the unique characteristics of different service types in terms of the spectrum and are used in computing the main channel signals as well as the crosstalk interference.

Five major xDSL service types differentiated and identified in various embodiments of the present invention are: HDSL, SDSL, DMT ADSL, CAP ADSL, and G.Lite. Pulse shaper is one of the characteristics that are associated with each single-carrier service types such as SDSL and CAP ADSL. Other parameters including transmit frequency band, transmit power spectrum may also be used in various embodiments of the present invention. As an example, several of the service parameters for HDSL are provided, it being understood that such service parameters would be known or easily obtained by one skilled in the art, for other service-types, such as ADSL, g.Lite, etc.

HDSL

HDSL is the abbreviation of High Bit Rate Digital Subscriber Line. Typically, HDSL is designed to run at fixed speeds. HDSL usually uses two pairs of wires with each pair conveying 784 kbps in both directions. The transmit frequency for HDSL is from 0 to 196 kHz and the sampling rates on both CPE and CO side are 392 kHz. Since HDSL uses 2BIQ modulation scheme, 784 kbps can be conveyed in both directions.

The spectrum of HDSL pulse shaper is used to compute the main HDSL channel parameters as well as its interference to other service lines that have different transmit frequencies. If both the victim and the disturber are HDSL, then the spectrum of HDSL pulse shaper is also what is observed from the victim. However, if the victim is some other service type, the observed effect of the pulse shaper will be different. This service specific pulse shaper spectrum information is used in various embodiments of the present invention to reconstruct the noise at the receiver and diagnose the interference and disturber service type. In one example, the transmit power at both CO and CPE sides during Showtime is −37 dBm/Hz while the transmit power is increased by 7 dB during Training to −30 dBm/Hz.

Overview of System Architecture of the Present Invention

As mentioned previously, DSL networks typically have several computational (processing) levels. Accordingly, one embodiment of the management software provided by the present invention can be operated on various computational levels, which correspond to the processing levels found in a DSL network. However, it should be noted that similar computational levels may exist in similar communications networks, and that various embodiments of the present invention can be adapted to monitor and diagnose such similar communications networks.

As a brief review, the first (highest) computational level in a DSL environment is the Network Management System (NMS) and/or Element Management System. These supervisory programs interact with a Digital Subscriber Line Access Multiplexer (DSLAM), the next highest computational level. The DSLAM's, in turn, manage one or more line cards (next highest computational level), each containing a plurality of line processors (lowest computational level), which handle the actual signals on each line. Limited computational resources exist at the lowest levels, and transmission bandwidth between the different levels is limited. For these reasons, allocation of processing and storage resources must be carefully balanced with bandwidth requirements.

The architecture of one embodiment of the present invention is such that this tradeoff can be made on a case-by-case basis. For example, if bandwidth between levels is at a premium, some of the present invention's modules can be moved to the line card level. On the other hand, if computational resources at the line card level are at a premium, some of the modules can be moved up to the EMS/NMS level. In some embodiments, a plurality of modules can reside at the DSLAM level.

In one embodiment, the diagnostic engine of the present invention may reside at the EMS or NMS level, or it may be a separate layer at the CO level (e.g. an "aggregator" box) which processes all the data and then send only reports up to the NMS.

Some processing of data from individual lines can be performed at the line card level or at the DSLAM level (the latter is more likely), namely on the DSLAM control processor module. This processing takes in the data from each line modem and computes the probabilities of different events having occurred on that line (for example: the SNR has changed by +5 db (just a measurement of noise) with probability 95%, and it has not changed with probability 5%). This processing reduces the volume of data that has to be transferred to the diagnostic engine. However, the diagnostic engine needs to collect data from all the monitored lines (in-domain) in the CO (e.g. anywhere from 100 lines to 50,000 lines) in order to correlate them and come up with accurate diagnoses. So, not all processing can take place at the line card or DSLAM level. In fact, one of the unique aspects of the present invention is its correlation of observations across all the in-domain lines in the CO.

Figure 7:
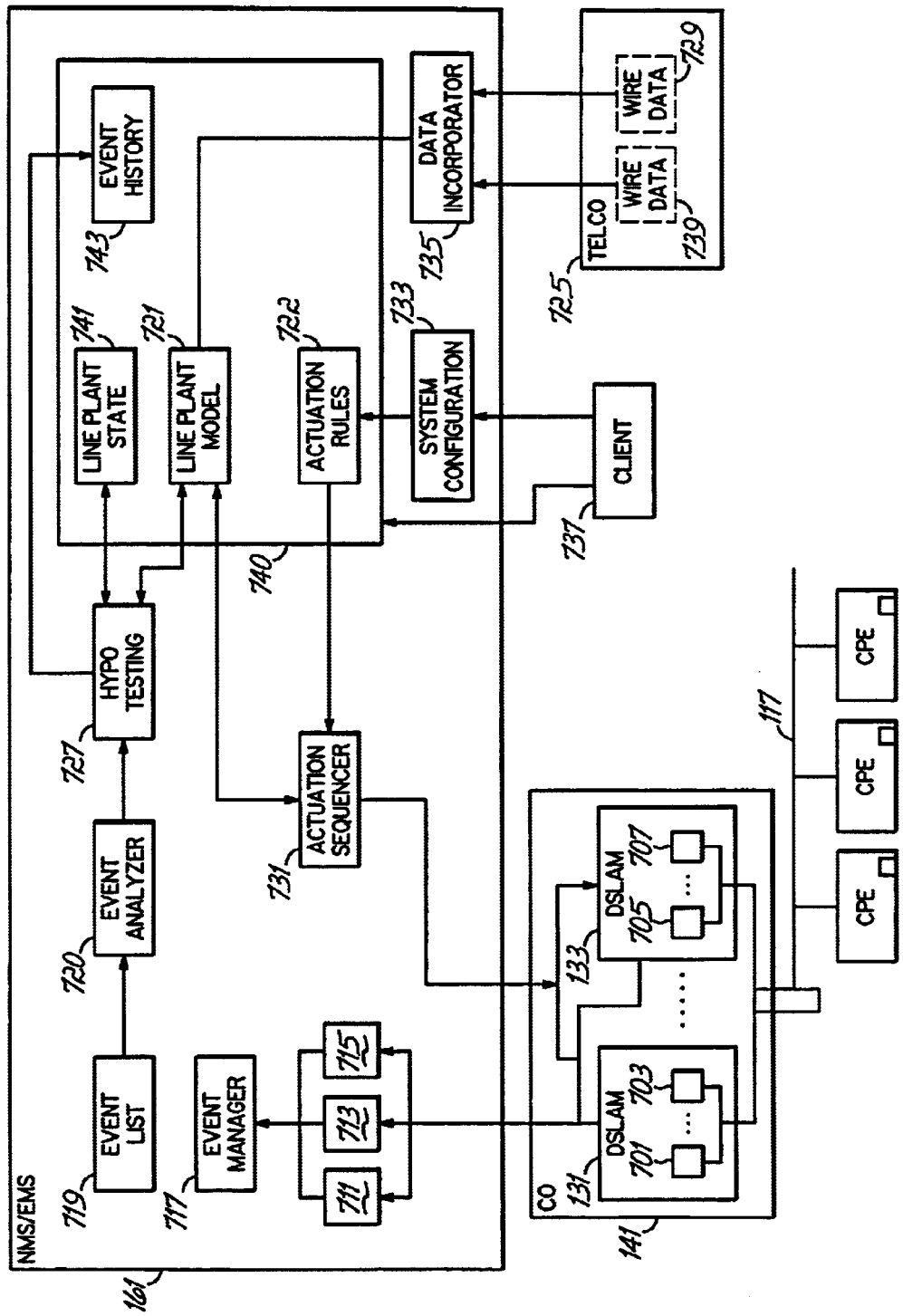
FIG. 7 shows a layout of one embodiment of the present invention superimposed on the layout of FIG. 1.

FIG. 7 shows a sample layout of an embodiment of the present invention in a DSL system. In one embodiment, the core architecture of the present embodiment includes a plurality of blocks: line processor 701, 703, 705, 707; event manager 717; event analyzer 720; hypothesis testing 727; actuation sequencer 731, system configuration 733, telephone company (TELCO) data incorporation 725, and database 740. In this embodiment, all modules except line processor 701, 703, 705, 707 and TELCO data incorporation 725 reside at the NMS/EMS level. In an alternative embodiment, line processor 701, 703, 705, 707 could reside at the NMS/EMS or line card level instead of the DSLAM level as shown.

Line Data 723 may include one of more of the following:
1. upstream and downstream SNR for each active bin Digital Multi Tone (DTM) or aggregate (non-DMT);
2. upstream and downstream attenuation Attenuation (ATN) for each active bin or aggregate;
3. upstream and downstream Power (PWR) for each active bin or aggregate;
4. upstream and downstream active bins (DMT only);
5. upstream and downstream bit loading (DMT only);
6. the operating mode of the modem (e.g. power-up, idle, activating, training, steady state); and
7. configuration information for the operating mode (e.g. power level).

In one embodiment, DSLAM 131, 133 may provides access to line data and access to lines 117 for forced actuation.

Client 737 is a user of the present invention. In one embodiment, client 737 can command forced mode changes (e.g. changes in a line's state, such as a transition from idle to showtime) as well as set or modify system configuration 733. In another embodiment, client 737 can access database 740 to obtain reports.

Telco Data 725 represents statistical and other data provided by telephone companies about binder configurations and physical wirings. In one embodiment, binder data 729 may include information about binder configuration and service assignments, including information about lines outside the monitored system. Wire Data 739 may include information about physical wiring, such as lengths, gauges, and bridge taps. In one embodiment, Binder Data 729 and Wire Data 739 are optional.

Database 740 may include one or more of the following items Event log 711, 713, 715; Event List 719; Event Classification (not shown); Event History 743; Line Plant Model 721; Event thresholds (not shown); and Analysis parameters (not shown).

Event log 711, 713, 715 is a summary of an event and is produced by Line Processor 701, 703, 705, 707. Event log 711, 713, 715 may include, inter alia, a time stamp or an identification of the type of event (SNR change or mode change). If an event type is a SNR change, the event log may include: the noise and signal for selected bins (DMT) or aggregate (non-DMT); the change in noise and signal for selected bins or aggregate; the rate of change of noise and signal for selected bins or aggregate; bit loading and active bins (DMT). Otherwise, the event log may include: identification of the operating mode (e.g. idle, showtime, training, etc.), operating parameter details, and bit loading and active bins (DMT).

Event List 719 is a list of events observed from all lines over the last few sample periods.

Event Classification (not shown) is a list of the last few events detailing observed correlation (or lack thereof).

Event History 743 may include the history of all interference events with identified or postulated causes. In some embodiments, old events may be purged regularly.

Line Plant Model 721 provides a current understanding of the coupling between each pair of lines in the domain (monitored system) to lines or services outside the domain or to AM stations. Line Plant State 741 provides a current understanding of the impairment from each source on each line, including AM interference, thermal interference, impairment from lines inside the domain, and impairment from lines or services outside the domain. Actuation rules 722 provides rules for forcing lines to change modes (operating states) during periods of forced actuation.

Event thresholds (not shown) provides thresholding parameters for detecting events during line processing. Analysis parameters (not shown) provides any analysis settings that need to be set from the outside.

Line Processor 701, 703, 705, 707

These blocks are responsible for monitoring the observed line data for persistent changes in operation (e.g. signal strength), or operating mode (e.g. idle to showtime). If a change in operation is detected, the module separates the noise and signal, reduces the collected data to a subset of relevant bins or bin combinations (DMT), and generates an even log 711, 713, 715, which is forwarded to event manager 717. When a line's mode changes, the line processor module generates an event log, but without the detailed signal and noise information. Depending on the embodiment, the line processor module may reside on the line card, on the DSLAM, or at the NMS/EMS level.

Event Manager 717

This block is responsible for collecting events from all lines that report events over a sample period. As events are collected (or afterwards), they are compiled into an events list 719, which is forwarded to event analyzer 720 for further processing. Depending on the embodiment, event manager may reside on a DSLAM (e.g. one event manager on each DSLAM in the domain) or at the NMS/EMS level.

Event Analyzer 720

This block updates the line plant model 721 based on new information extracted from event list 719. In one embodiment, the update proceeds in two stages. First, the events are correlated. Then the strength of the correlation is identified using parameter estimation techniques. In some embodiments, event analyzer may access data from lines that have not reported events recently. This data should be available from DSLAM 131, 133. In one embodiment, event analyzer resides at the NMS/EMS level.

Hypothesis Testing 727

This block establishes the causes for each event, thus building up its knowledge of the major disturbers on each line. This knowledge is stored in the Line Plant State 741, and also used to augment event history 743. In one embodiment, the hypothesis testing module includes four testing blocks: AM hypothesis, thermal hypothesis, extra-domain hypothesis, and in-domain hypothesis. Each testing block relies on a Bayesian belief network to compute the line plant state. In one embodiment, each testing block cycles through a pre-processing stage to a Bayesian Belief Network computation, and outputs a result which is then passed along to other modules for further processing.

Actuation Sequencer 731

This block determines the actuation for forced mode changes. It also sequences the mode changes up and sends them to the DSLAM 131, 133. In one embodiment, the actuation sequencer module uses line plant model 721 to establish which couplings are not well known. It also uses actuation rules 722 to determine how and when to change the modes.

System Configuration 733

This block allows the user to configure various parameters of the system. For example, in one embodiment, system configuration module can be used to define or to change which lines are in the domain. The module is also used to set those detection and analysis parameters that need to be changeable at runtime. In some embodiments, system configuration module also establishes rules for forced mode changes.

Data Incorporator 735

In one embodiment, this module allows the use of TELCO data to enhance the line plant model 721, which may be useful to speed up the initial learning to the system. In one embodiment, inclusion of this module is optional, in the sense that the system will establish this information over time, as it processes events.

In summary, various embodiments of a technique and apparatuses for the detection and diagnosis of interference in a communication network have been described. In the foregoing specification, the invention has been described with reference to specific exemplary embodiments. It will, however, be evident that various modifications and changes may be made thereto without departing from the broader spirit and scope of the invention as set forth in the appended claims. For instance, the technique and apparatuses may be used in fields other than DSL service deployment, such as diagnosing network packet traffic through a router. The detailed description and the drawings are, accordingly, to be regarded in an illustrative rather than a restrictive sense.

What is claimed is:

1. A method for diagnosing impairments in a communication system, the method comprising:

accumulating statistical information about an impairment type associated with an impairment source;

creating an initial a priori statistical model associated with the impairment type and impairment source based upon the accumulated statistical information;

creating an a posteriori statistical model of the impairment type by collecting a plurality of probability density functions corresponding to a signal-to-noise ratio associated with the impairment type from at least one signal line of the communication system;

creating an updated a priori statistical model based upon the a posteriori statistical model and the initial a priori statistical model; and using the updated a priori statistical model to diagnose the impairment type among signal lines of the communication system.

2. The method according to claim 1, wherein the impairment type is an external (out of domain) impairment type.

3. The method according to claim 2, wherein the external impairment source associated with the external impairment type is one of AM radio interference and thermal interference.

4. The method according to claim 2 further comprising determining a presence of an external impairment type by evaluating at least one of a rate of signal to noise ratio change and number of lines disturbed.

5. The method according to claim 2, wherein the communication system is a Digital Subscriber Line (DSL) system.

6. The method according to claim 1, wherein the impairment type is an internal (in domain) impairment type.

7. The method according to claim 6, wherein the communication system is a Digital Subscriber Line (DSL) system.

8. The method according to claim 7 further comprising collecting statistical data about an aggregate signal-to-noise ratio of the communication system.

9. The method according to claim 8, wherein the statistical data about the aggregate signal-to-noise ratio of the communication system comprises a plurality of distinct probability density functions corresponding to the signal-to-noise ratio of different combinations of internal impairment types and at least one signal line of the DSL system.

10. The method according to claim 7 further comprising collecting statistical information about aggregate power attenuation values.

11. The method according to claim 1, further comprising performing a statistical parameter estimation.

12. The method according to claim 1 further comprising performing a hypothesis test.

13. The method according to claim 1, wherein the communication system is a Digital Subscriber Line system.

14. A computer readable medium containing executable instructions which, when executed in a processing system, cause said system to perform a method comprising:

compiling statistical models of physical layers of a communication system;

collecting a plurality of probability density functions corresponding to a signal-to-noise ratio of different combinations of impairments associated with impairment sources and at least one signal line of the communication system;

creating at least one a priori distribution;

storing the statistical models and the a priori distribution in a storage medium; and diagnosing at least one impairment source in the communication system using the statistical models and the a priori distribution.

15. A computer readable medium containing executable instructions which, when executed in a processing system, cause said system to perform a method for diagnosing impairments in a communication system, the method comprising:

accumulating statistical information about an impairment type associated with an impairment source;

creating an initial a priori statistical model associated with the impairment type and impairment source based upon the accumulated statistical information;

creating an a posteriori statistical model of the impairment type by collecting a plurality of probability density functions corresponding to a signal-to-noise ratio associated with the impairment type from at least one signal line of the communication system;

creating an updated a priori statistical model based upon the a posteriori statistical model and the initial a priori statistical model; and using the updated a priori statistical model to diagnose the impairment type among signal lines of the communication system.

16. The computer readable medium according to claim 15, wherein the impairment type is an external (out of domain) impairment type.

17. The computer readable medium according to claim 15 further comprising detecting a signal to noise ratio change.

18. The computer readable medium according to claim 15, wherein the impairment type is an internal (in domain) impairment type.

19. The computer readable medium according to claim 18, wherein the communication system is a Digital Subscriber Line (DSL) system.

20. The computer readable medium according to claim 18 further comprising collecting statistical data about an aggregate signal-to-noise ratio of the communication system.

21. The computer readable medium according to claim 20, wherein the statistical data about the aggregate signal-to-noise ratio to the communication system comprises a plurality of distinct probability density functions corresponding to the signal-to-noise ratio of different combinations of internal impairment types and at least one signal line of the DSL system.

22. The computer readable medium according to claim 18 further comprising collecting statistical information about aggregate power attenuation values.

23. The computer readable medium according to claim 15 further comprising performing a statistical parameter estimation.

24. The computer readable medium according to claim 15 further comprising performing a hypothesis test.

25. An article of manufacture comprising a program storage medium readable by a computer and tangibly embodying at least one program of instructions executable by said computer to perform a method comprising:

compiling statistical models of physical layers of a communication system;

collecting a plurality of probability density functions corresponding to a signal-to-noise ratio of different combinations of impairments associated with impairment sources and at least one signal line of the communication system;

creating at least one a priori distribution;

storing the statistical models and the a priori distribution in a storage medium; and diagnosing at least one impairment source in the communication system using the statistical models and the a priori distribution.

26. An article of manufacture comprising a program storage medium readable by a computer and tangibly embodying at least one program of instructions executable by said computer to perform a method for diagnosing impairments in a communication system, the method comprising:

accumulating statistical information about an impairment type associated with an impairment source;

creating an initial a priori statistical model associated with the impairment type and impairment source based upon the accumulated statistical information;

creating an a posteriori statistical model of the impairment type by collecting a plurality of probability density functions corresponding to a signal-to-noise ratio associated with the impairment type from at least one signal line of the communication system;

creating an updated a priori statistical model based upon the a posteriori statistical model and the initial a priori statistical model; and using the updated a priori statistical model to diagnose the impairment type among signal lines of the communication system.

27. The article of manufacture according to claim 26, wherein the impairment type is an external (out of domain) impairment type.

28. The article of manufacture according to claim 26 further comprising detecting a signal to noise ratio change.

29. The article of manufacture according to claim 26, wherein the impairment type is an internal (in domain) impairment type.

30. The article of manufacture according to claim 29, wherein the communication system is a Digital Subscriber Line (DSL) system.

31. The article of manufacture according to claim 29 further comprising collecting statistical data about an aggregate signal-to-noise ratio of the communication system.

32. The article of manufacture according to claim 31, wherein the statistical data about the aggregate signal-to-noise ratio of the communication system comprises a plurality of distinct probability density functions corresponding to the signal-to-noise ratio of different combinations of the internal impairment types and at least one signal line of the DSL system.

33. The article of manufacture according to claim 29 further comprising collecting statistical information about the aggregate power attenuation values.

34. The article of manufacture according to claim 26 further comprising performing a statistical parameter estimation.

35. The article of manufacture according to claim 26 further comprising performing a hypothesis test.

* * * * *

UNITED STATES PATENT AND TRADEMARK OFFICE
CERTIFICATE OF CORRECTION

| | |
|---|---|
| PATENT NO. | : 6,870,901 B1 |
| APPLICATION NO. | : 09/711684 |
| DATED | : March 22, 2005 |
| INVENTOR(S) | : Thorkell Gudmundsson et al. |

It is certified that error appears in the above-identified patent and that said Letters Patent is hereby corrected as shown below:

On the title page, item [56]

Page 2, OTHER PUBLICATIONS, lines 25-26 read "...Models", ANSI Contribution TIE1.4/97-302 Technical Subcommitte Working Group Members, Spectral Compatibility,..." and should read --...Models", ANSI Contribution TIE1.4/97-302 Technical Subcommittee Working Group Members, Spectral Compatibility,... --.

Column 1, line 15 reads "SPECTRAL MANAGEMENT AND OP ATION..." and should read -- SPECTRAL MANAGEMENT AND OPTIMIZATION...--.

Column 1, line 23 reads "...RELATIONSHIPS IN DYNAMIC NEIWORKS", application..." and should read --...RELATIONSHIPS IN DYNAMIC NETWORKS", application...--.

Column 7, line 52-53 reads "...premise equipment (CPE) 101, 103, 105, located on level A, are communicatively coupled to a central office (CO) ..." and should read -- ...premise equipment (CPE) 101, 103, 105, located on level A, is communicatively coupled to a central office (CO) ...--.

Column 8, line 37 reads "...161. Located at level A, the highest level of processing..." and should read -- ...161. Located at level A, the lowest level of processing...--.

Column 9, line 49 reads "...ADSL, HDSL, AM, thermal, etc.)" and should read -- ...ADSL, HDSL, AM, thermal, etc.). --.

Column 10, lines 29-30 read "...(transmit frequency 196 KHz) and SDSL (transmit frequency 580 KHz). Assuming that the magnitude of upstream..." and should read -- ...(transmit frequency 196 kHz) and SDSL (transmit frequency 580 kHz). Assuming that the magnitude of upstream... --.

Column 10, line 32 read "...figures show that six our of forty-nine results obtained for a..." and should read -- ...figures show that six out of forty-nine results obtained for a... --.

Column 10, line 48 reads "...to produce a posterior probability distributions from which..." and should read -- ...to produce *a posteriori* probability distributions... --.

Column 10, line 58 reads, "...nventors: John Josef Hench, Thorkell Gudmundsson, Amir..." and should read -- ...inventors: John Josef Hench, Thorkell Gudmundsson, Amir...--.

UNITED STATES PATENT AND TRADEMARK OFFICE
CERTIFICATE OF CORRECTION

PATENT NO. : 6,870,901 B1
APPLICATION NO. : 09/711684
DATED : March 22, 2005
INVENTOR(S) : Thorkell Gudmundsson et al.

It is certified that error appears in the above-identified patent and that said Letters Patent is hereby corrected as shown below:

Column 11, line 17 reads, "...state/non steady state transitions should be developed. An..." and should read -- ...state/non-steady state transitions should be developed. An...--.

Column 11, line 22 reads, "Bayeslan Estimation Techniques" and should read -- Bayeslian Estimation Techniques --.

Column 11, line 38 reads, "...be written as conditional probability density function p(x|y)" and should read --...be written as conditional probability density function p(x|y). --.

Column 15, line 4 reads, "...if the corresponding event is in-domain or out-of domain..." and should read --...if the corresponding event is in-domain or out-of-domain... --.

Column 15, line 64 reads, "...603, 605 represent software modules deployed at various the..." and should read -- ...603, 605 represent software modules deployed at the... --.

Column 16, line 28 reads, "...service-types, such as ADSL, g.Lite, etc." and should read -- ...service-types, such as ADSL, G.Lite, etc. --.

Column 16, line 36 reads, "...uses 2BIQ modulation scheme, 784 kbps can be conveyed in..." and should read -- ...uses 2B1Q modulation scheme, 784 kbps can be conveyed in...--.

Column 17, line 21-22 reads, "...a separate layer at the CO level (e.g. an "aggregator" box) which processes all the data and then send only reports up..." and should read -- ...a separate layer at the CO level (e.g. an "aggregator" box) which processes all the data and then sends only reports up...--.

Column 17, line 56 reads, "...Digital Multi Tone (DTM) or aggregate (non-DMT);..." and should read -- ...Digital Multi Tone (DMT) or aggregate (non-DMT);... --.

Column 17, lines 57-58 read, "2. upstream and downstream attenuation Attenuation (ATN) for each active bin or aggregate;" and should read -- 2. upstream and downstream attenuation (ATN) for each active bin or aggregate; --.

Column 18, line 1 reads, "In one embodiment, DSLAM 131, 133 may provides access..." and should read -- In one embodiment, DSLAM 131, 133 may provide access... --.

UNITED STATES PATENT AND TRADEMARK OFFICE
CERTIFICATE OF CORRECTION

PATENT NO. : 6,870,901 B1
APPLICATION NO. : 09/711684
DATED : March 22, 2005
INVENTOR(S) : Thorkell Gudmundsson et al.

It is certified that error appears in the above-identified patent and that said Letters Patent is hereby corrected as shown below:

Column 18, lines 63-64 read, "...relevant bins or bin combinations (DMT), and generates an even log 711, 713, 715, which is forwarded to event manager..." and should read -- ...relevant bins or bin combinations (DMT), and generates an event log 711, 713, 715, which is forwarded to event manager... --.

Signed and Sealed this

Twenty-third Day of October, 2007

JON W. DUDAS
*Director of the United States Patent and Trademark Office*